W. R. STEVENS.
DIRECTION INDICATOR FOR VEHICLES.
APPLICATION FILED MAY 16, 1916.
1,335,355.
Patented Mar. 30, 1920.
2 SHEETS—SHEET 1.
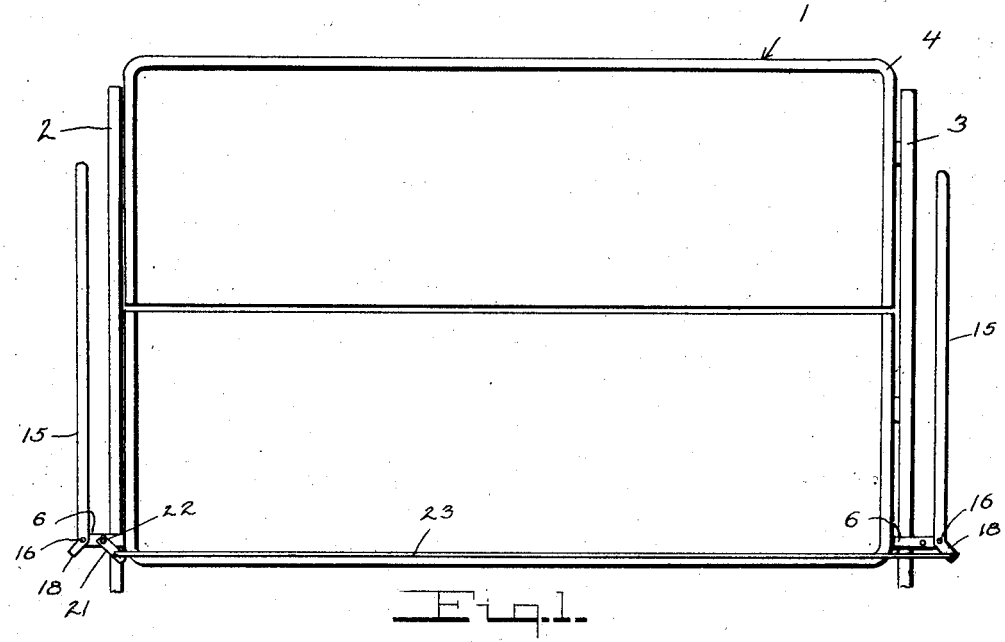
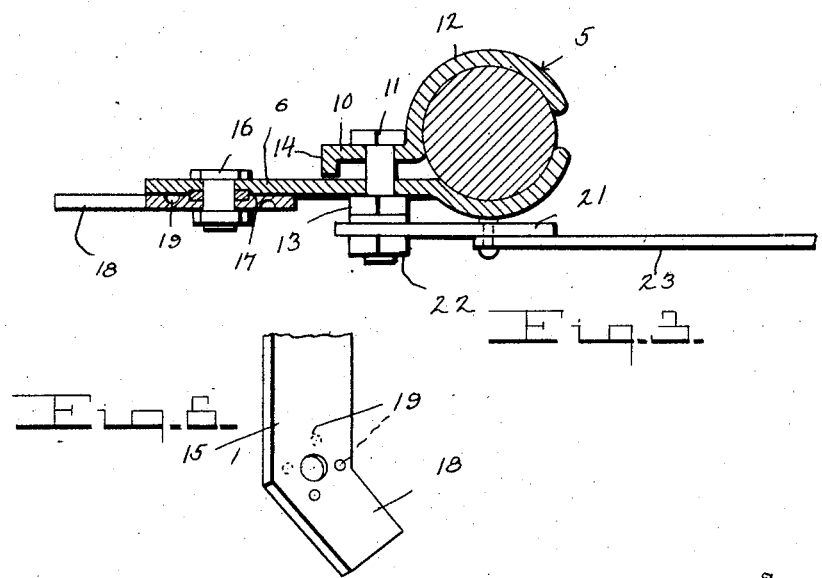
Inventor
W. R. Stevens

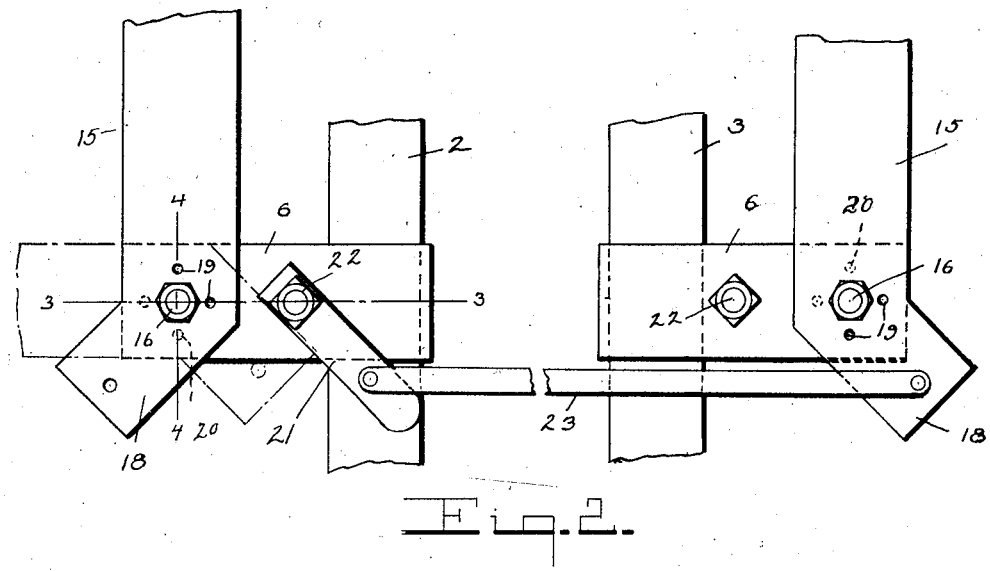
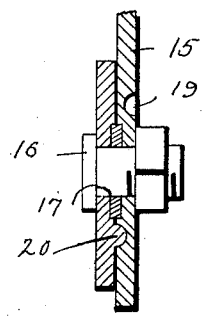
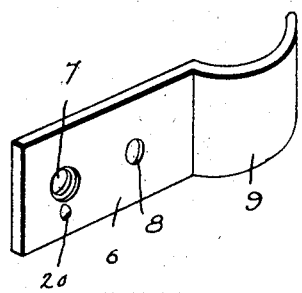

UNITED STATES PATENT OFFICE.

WALTER R. STEVENS, OF RICHMOND, INDIANA.

DIRECTION-INDICATOR FOR VEHICLES.

1,335,355. Specification of Letters Patent. Patented Mar. 30, 1920.

Application filed May 16, 1916. Serial No. 97,870.

*To all whom it may concern:*

Be it known that I, WALTER R. STEVENS, a citizen of the United States, residing at Richmond, in the county of Wayne and State of Indiana, have invented certain new and useful Improvements in Direction-Indicators for Vehicles; and I do hereby declare the following to be a full, clear, and exact description of the invention, such as will enable others skilled in the art to which it appertains to make and use the same.

This invention relates to a direction indicator for a vehicle and has for its primary object to provide means whereby the operator may readily notify traffic of his intention of travel or when he is going to stop.

An object of this invention is to provide indicating arms pivotally secured to each side of the wind shield of the vehicle, whereby the operator may swing one or the other of the arms to a horizontal position to indicate to the traffic he is going to turn to the left or right or may swing both of the arms to a horizontal position to indicate that a stop is going to be made.

Another object of this invention is to provide a novel means of detachably securing the indicating arms to each side of the wind shield, whereby when the arms are swung to a horizontal position, they will be in clear view of the traffic in front and rear of the vehicle.

A further object of this invention is to provide means connected to the indicating arms, whereby they may be operated independently of each other.

A still further object of this invention is the provision of a direction indicator for vehicles of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a rear elevation of a wind shield, illustrating my invention applied thereto, Fig. 2 is an enlarged fragmentary rear elevation illustrating the direction indicator for vehicles, constructed in accordance with my invention, Fig. 3 is a longitudinal sectional view taken on the line 3—3 of Fig. 2, Fig. 4 is a fragmentary vertical sectional view taken on the line 4—4 of Fig. 2, Fig. 5 is a perspective view of one of the sections of the clamps for securing the indicating arms to the wind shield, and Fig. 6 is a fragmentary plan view of one of the indicating arms.

Referring in detail to the drawings, the numeral 1 indicates as an entirety, a wind shield to which my invention is attached, consisting of supporting members 2 and 3, having wind shield glass frames 4 pivotally secured thereto.

A clamp 5 consisting of a pair of sections and one of said sections consisting of an elongated plate 6 having a pair of openings 7 and 8 therein. Formed on one end of the plate 6 is an arcuate shaped member 9 which surrounds a portion of one of the supporting members of the wind shield. The other section of the clamp 5 consists of a plate 10 having openings therein for receiving a bolt 11. Formed on one end of the plate 10 is an arcuate shaped member 12 which surrounds the other portion of the supporting members of the wind shield. The bolt 11 passes through the opening 8 in the plate 6 to receive a nut 13 for clamping the arcuate shaped members 9 and 12 upon the supporting members of the wind shield as clearly illustrated in Fig. 3. The plate 10 is provided with a projection 14 upon its free end for spacing the plates 10 and 6 apart when in an assembled position.

An indicating arm 15 is secured to the plate 6 by means of a bolt 16 passing through the opening 7 of the plate 6 to pivotally secure the indicating arm 15 to the clamp 5. A suitable washer 17 is interposed between the plate 6 and the indicating arm 15 upon the bolt 16 to space the plate 6 and indicating arm 15 apart. The lower end of the indicating arm 15 is bent in an inclined plane to form an operating handle for swinging the indicating arm 15 about its pivot. The indicating arm 15 is provided with pairs of oppositely disposed sockets 19 arranged around the pivot points upon each side thereof to be engaged by lugs 20 carried by the plate 6 of the clamp 5 for retaining the indicating arm 15 in a vertical position and also in a horizontal position as clearly illustrated in Figs. 1 and 2.

In applying this device to a wind shield, a clamp 5 is secured to each of the supporting members 2 and 3 and each having an indicating arm 15 thereon as clearly illustrated in Fig. 1. The indicating arm which is pivoted to the clamp that is secured to the supporting member 2 is adapted to be operated by the operator of the vehicle gripping the handle 18 of the indicating arm 15 to swing it to its signaling and non-signaling position. When said signaling arm is in a signaling position or horizontal position, the handle 18 engages the nut 13 which acts as a stop and limits the downward movement of said indicating arm and is held in a vertical position by means of the lug upon the plate 6 engaging the socket 19 thereof, which also will aid in holding this indicating arm in a horizontal position by the lug engaging the other socket 19.

In order to operate the indicating arm carried by the clamp 5 upon the supporting member 3 of the wind shield, an operating lever 21 is mounted on the bolt 11 upon the clamp which is carried by the supporting member 2 by means of a nut 22 and is free to turn thereon and has pivotally connected thereto a link 23. This link 23 extends across the wind shield as clearly illustrated in Fig. 1 and is engaged within an opening within the handle 18 of the indicating arm carried by the supporting member 3, whereby upon moving the operating lever 21, said indicating arm will be moved into a signaling position or non-signaling position. The lug upon the plate 6 of the clamp 5 which is secured to the supporting member 3 and the sockets carried by the indicating arm hold said indicating arm in signaling and non-signaling position, thus it will be seen that an operator of the automobile may readily operate the indicating arms upon each side of the wind shield independently of each other and also may move both of them to a horizontal or signaling position to indicate that a stop is to be made.

While I have shown and described the preferred embodiment of my invention, it is to be understood that minor features of construction, combination and arrangement of parts may be made without departing from the spirit and scope of the invention as claimed.

Having thus described my invention, what I claim is:

A direction indicator comprising horizontal clamps secured to the sides of a vehicle, indicating arms pivoted to the clamps adjacent their lower ends and normally disposed vertically and having their lower ends disposed angularly away from the vehicle and extended below the clamps, a transverse rod pivoted to the lower end of one of said arms and extending to the other side of the vehicle from said arms, a lever pivoted to the clamp of the other arm and normally extending downwardly and inwardly and having the free end of said rod pivoted thereto, said lever when in its normal position forms a stop for the last named arm when moved into signaling position and said lever is adapted to be limited in its movement by said arm to prevent moving the arm to which the rod is connected beyond a signaling position.

In testimony whereof I affix my signature in presence of two witnesses.

WALTER R. STEVENS.

Witnesses:
 FLORA A. STEVENS,
 CARL C. YOUNG.